(12) United States Patent
Zohar

(10) Patent No.: US 11,247,524 B2
(45) Date of Patent: Feb. 15, 2022

(54) VEHICLE AXLE

(71) Applicants: Gil Zohar, Ashqelon (IL); Eyal Eliyahu Ashkenazi, Ness Ziona (IL)

(72) Inventor: Gil Zohar, Ashqelon (IL)

( * ) Notice: Subject to any disclaimer, the term of this patent is extended or adjusted under 35 U.S.C. 154(b) by 0 days.

(21) Appl. No.: 16/968,883

(22) PCT Filed: Mar. 6, 2019

(86) PCT No.: PCT/IL2019/050247
§ 371 (c)(1),
(2) Date: Aug. 11, 2020

(87) PCT Pub. No.: WO2019/175861
PCT Pub. Date: Sep. 19, 2019

(65) Prior Publication Data
US 2021/0046793 A1 Feb. 18, 2021

Related U.S. Application Data

(60) Provisional application No. 62/641,451, filed on Mar. 12, 2018.

(51) Int. Cl.
*B60G 3/26* (2006.01)
*B60G 9/02* (2006.01)
*B60B 35/14* (2006.01)
*B60G 3/20* (2006.01)
*B60G 9/00* (2006.01)

(52) U.S. Cl.
CPC .................. *B60G 3/26* (2013.01); *B60G 9/02* (2013.01); *B60G 2200/144* (2013.01); *B60G 2200/32* (2013.01)

(58) Field of Classification Search
CPC . B60G 3/20; B60G 3/26; B60G 9/003; B60G 9/02; B60G 2200/144; B60G 2200/32; B60G 2200/314; B60G 2200/422; B60G 2200/419; B60G 2204/80; B60G 2204/83; B60G 2204/83022; B60G 2204/46; B60G 2204/4504; B60G 17/005; B60G 21/106; B60G 17/00; B60G 2204/45; B60G 2204/4602; B60G 2204/4604; B60G 2204/8302
See application file for complete search history.

(56) References Cited

U.S. PATENT DOCUMENTS

| 5,649,987 A | 7/1997 | Greulich |
| 2003/0038430 A1* | 2/2003 | Huhmarkangas ........ B60G 3/20 280/6.154 |
| 2021/0138860 A1* | 5/2021 | Dudding ................ B60G 9/003 |

* cited by examiner

*Primary Examiner* — James A English
*Assistant Examiner* — Daniel M. Keck

(57) ABSTRACT

A vehicle axle (10), including: a left axle (12L), a first side thereof being pivotally connected (50L) to a left wheel hub (14L); a right axle (12R), a first side thereof being pivotally connected (50R) to a right wheel hub (14R); a connector (20), disposed between second sides of the left (12L) and right (12R) axles for pivotally (28) connecting therebetween, for allowing pivotal motion therebetween; a first mechanism (52A,52B) for allowing and disallowing the pivotal motion between the left (12L) and right (12R) axles.

5 Claims, 5 Drawing Sheets

VEHICLE AXLE

TECHNICAL FIELD

The invention relates to the field of vehicles and axles therefor.

BACKGROUND

Some vehicles include dependent suspensions, and others include independent suspensions.

Each of the suspensions is advantaged and disadvantaged.

There is a long felt need to provide a solution to the above-mentioned and other problems of the prior art.

SUMMARY

A vehicle axle, including:
a left axle;
a right axle;
a connector for pivotally connecting therebetween; and
a first mechanism for allowing and disallowing the pivotal motion between the axles.

DETAILED DESCRIPTION

Figure 1:
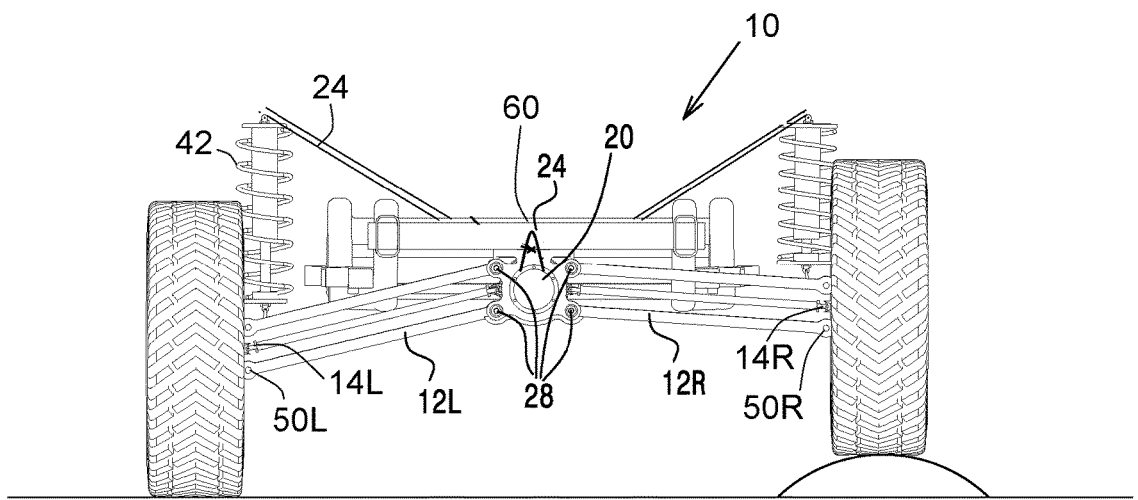
FIG. 1 is a front view of a vehicle axle according to one embodiment at an independent suspension state.

FIG. 1 is a front view of a vehicle axle according to one embodiment at an independent suspension state.

Figure 2:
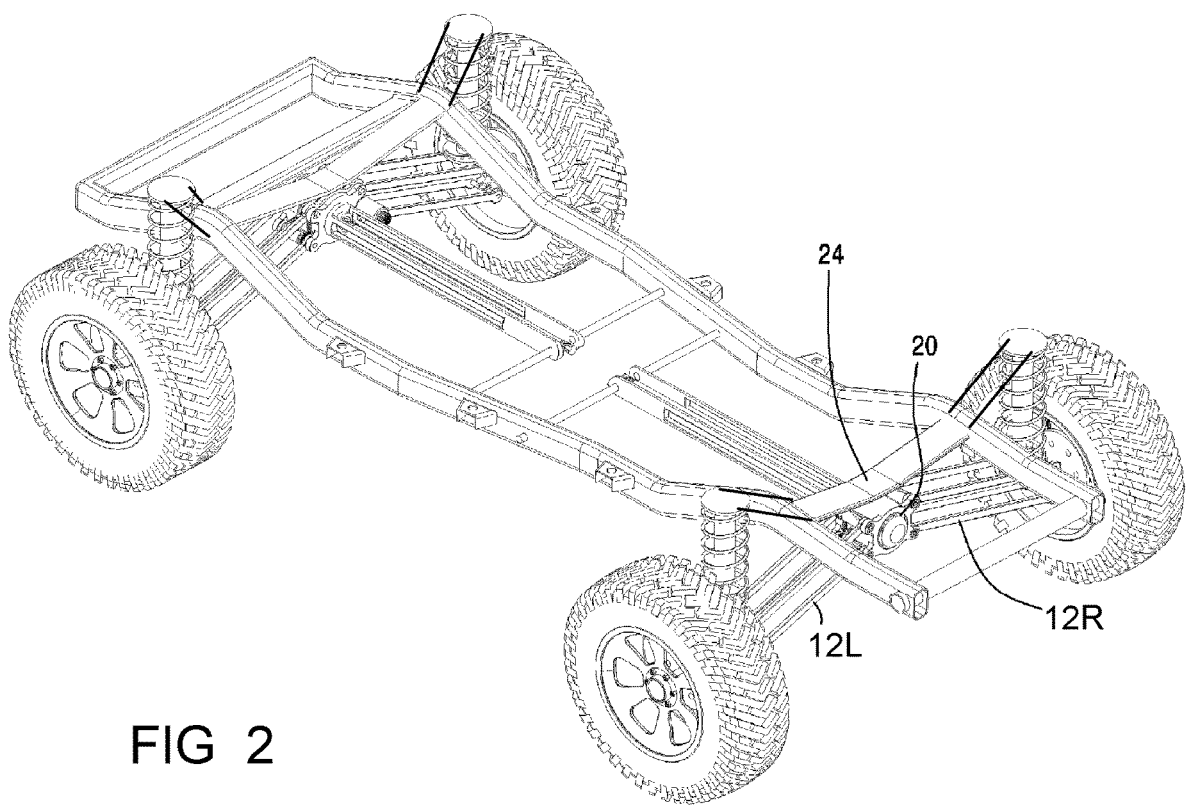
FIG. 2 is a perspective view of the vehicle frame including the vehicle axle of FIG. 1 at the independent suspension state.

FIG. 2 is a perspective view of the vehicle frame including the vehicle axle of FIG. 1 at the independent suspension state.

A vehicle axle 10 according to one embodiment of the invention includes a left axle 12L, being pivotally connected, via a hinge 50L, to the left vehicle wheel hub 14L; a right axle 12L, being pivotally connected, via a hinge 50R, to the right vehicle wheel hub 14R; and a connector 20, being pivotally connected to left axle 12L and to right axle 12R, such as by hinges 28.

At this state, connector 20 is anchored to the center 60 of chassis 24 of the vehicle, and connector 20 provides free rotation of left axle 12L in relation to right axle 12R, for swinging therebetween, while being anchored to chassis 24. Thus, axles 12L and 12R form at this state an independent suspension.

Figure 3:
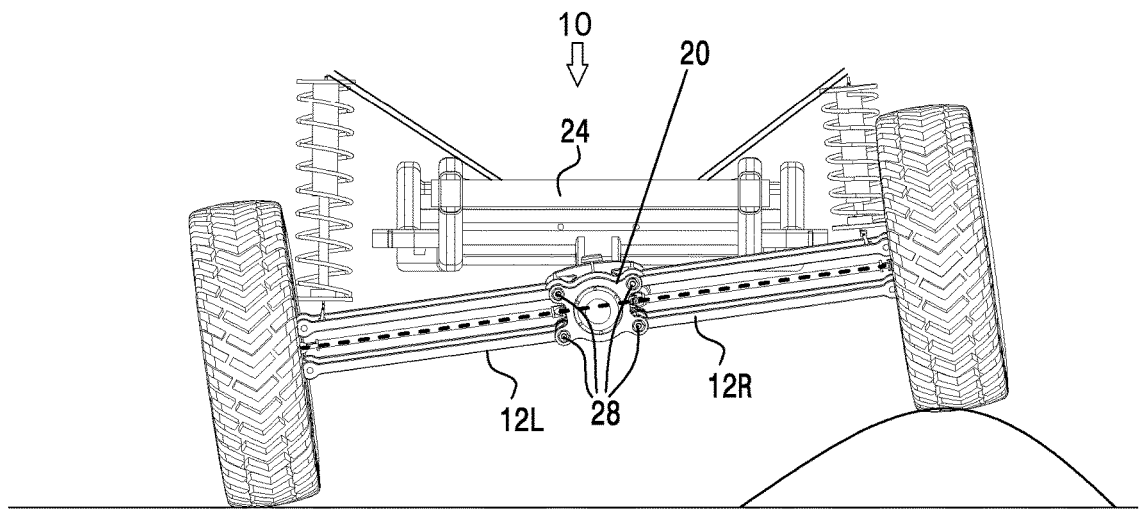
FIG. 3 is a front view of the vehicle axle of FIG. 1, at a dependent suspension state.

FIG. 3 is a front view of the vehicle axle of FIG. 1, at a dependent suspension state.

Figure 4:
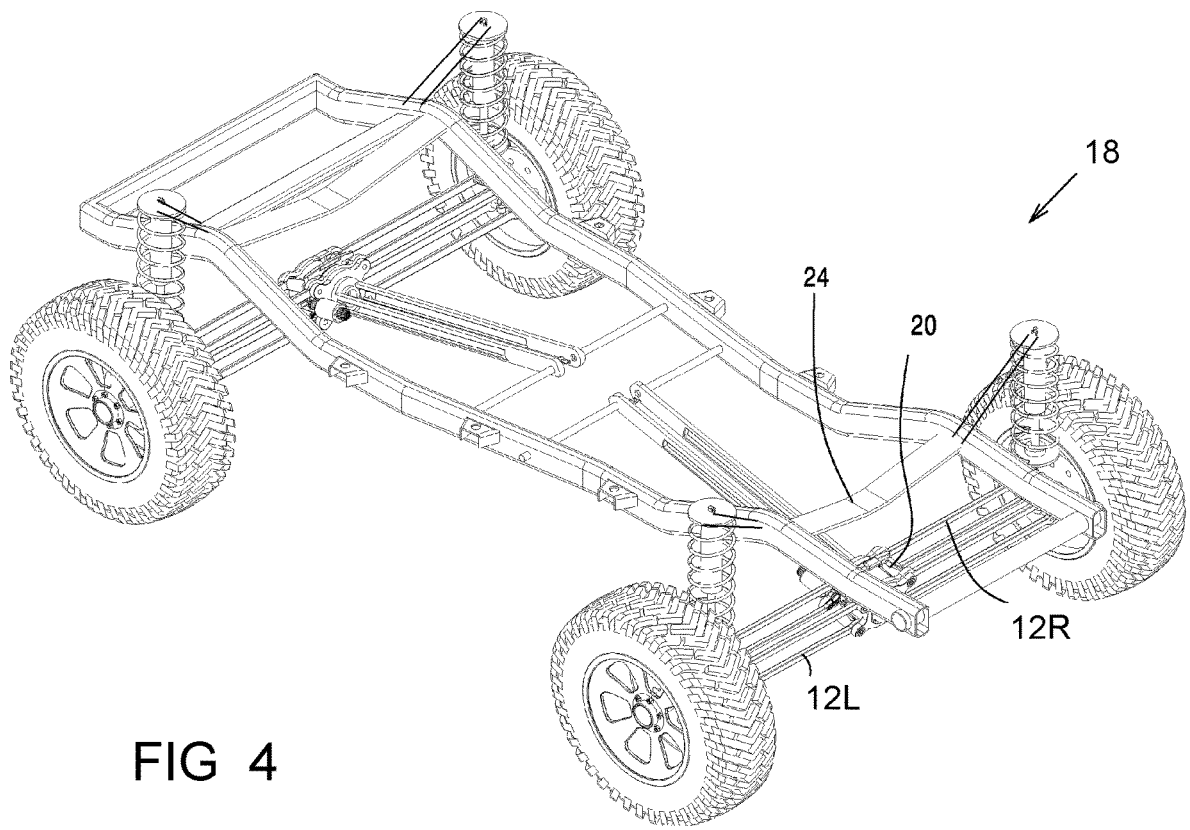
FIG. 4 is a perspective view of the vehicle frame including the vehicle axle of FIG. 3 at the dependent suspension state.

FIG. 4 is a perspective view of the vehicle frame including the vehicle axle of FIG. 3 at the dependent suspension state.

At the dependent suspension state, left axle 12L is yet pivotally connected to left wheel 14L; and right axle 12L is pivotally connected to right wheel 14L.

However, at this state left axle 12L and right axle 12R are rigidly connected one to the other, forming together a straight axle or any fixed angle therebetween (herein named "rigid axle").

Further at this state, connector 20 is separated from chassis 24 of the vehicle, thus the rigid axle formed by left axle 12L and right axle 12R, is not held by chassis 24.

Figure 5:
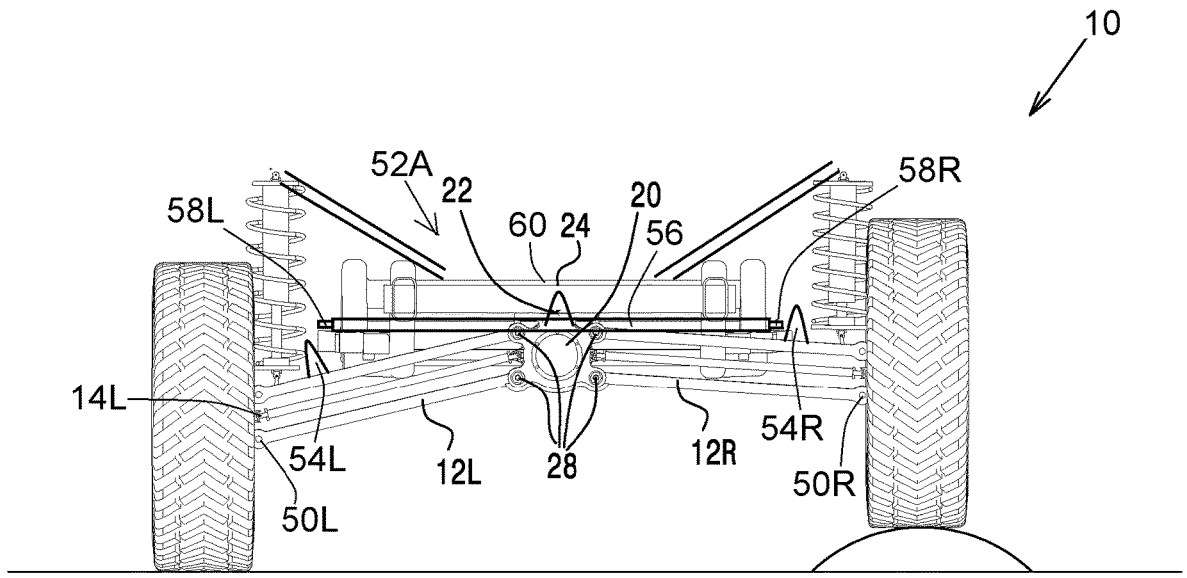
FIG. 5 is the front view of the axle of FIG. 1 at the independent suspension state of FIG. 1, including a mechanism.

FIG. 5 is the front view of the axle of FIG. 1 at the independent suspension state of FIG. 1, including a mechanism according to one embodiment, for providing the independent suspension state of FIG. 1 and the dependent suspension state of FIG. 3.

A mechanism 52A for providing the two states, may include a ring 54L extending from left axle 12L; a ring 54R extending from right axle 12R; a bar 56 fixed to connector 20, for being rotated by rotation of connector 20; an extension 58L, such as motorized, hydraulic or pneumatic, for being extendable from the left end of bar 56 towards left ring 54L; an extension 58R, for being extendable from the right end of bar 56 towards right ring 54R; and a ring 22, for being extendable from connector 20, for allowing binding center 60 of chassis 24 thereto.

At the independent suspension state of FIG. 5, extensions 58L and 58R are not inserted into rings 54L and 54R respectively, thus bar 56 freely rotates with connector 20. However, this rotation of bar 56 has no effect on any of axles 12L and 12R, thus axles 12L and 12R are independent of one another.

At this independent suspension state of FIG. 5, ring 22 grips center 60 of chassis 24, thus the independency of axles 12L and 12R one from the other is limited by chassis 24.

Figure 6:
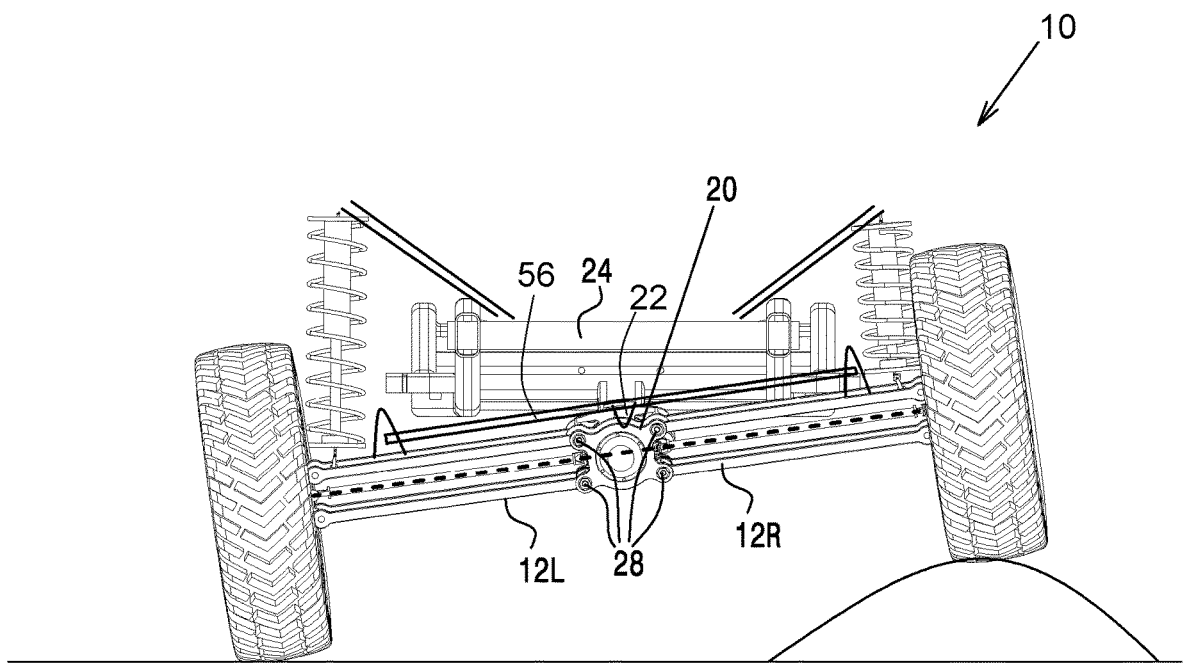
FIG. 6 is the front view of the axle of FIG. 1 at the dependent suspension state of FIG. 3, including the mechanism of FIG. 5.

FIG. 6 is the front view of the axle of FIG. 1 at the dependent suspension state of FIG. 3, including the mechanism of FIG. 5.

At the dependent suspension state of FIG. 6, extensions 58L and 58R are inserted into rings 54L and 54R respectively, thus left axle 12L and right axle 12R are rigidly connected one to the other, forming together the rigid axle of FIG. 3.

At this dependent suspension state of FIG. 6, ring 22 releases chassis 24, for releasing the rigid axle therefrom.

Figure 7:
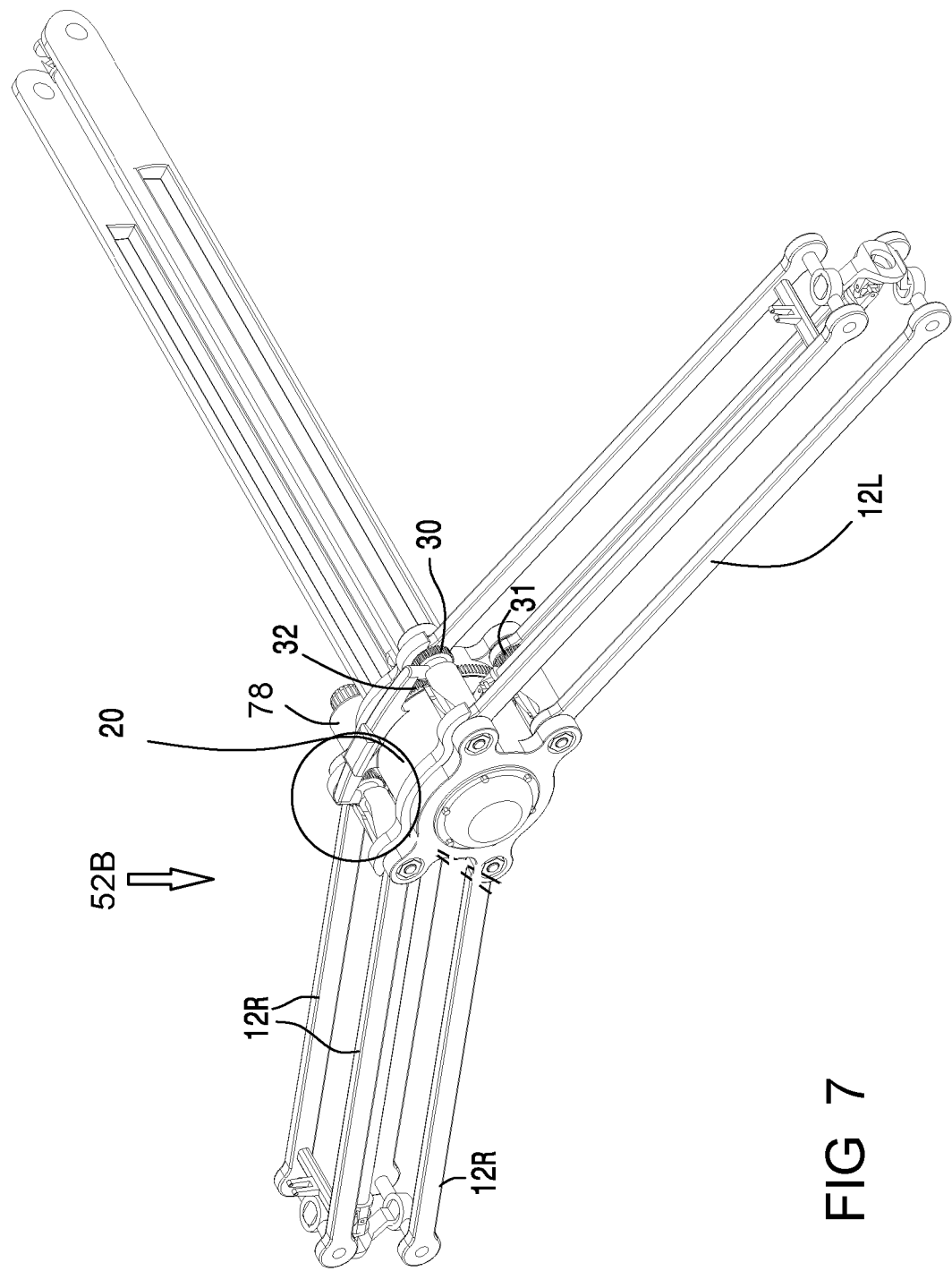
FIG. 7 depicts another mechanism for providing the dependent and independent states.

FIG. 7 depicts another mechanism for providing the dependent and independent states.

Figure 8:
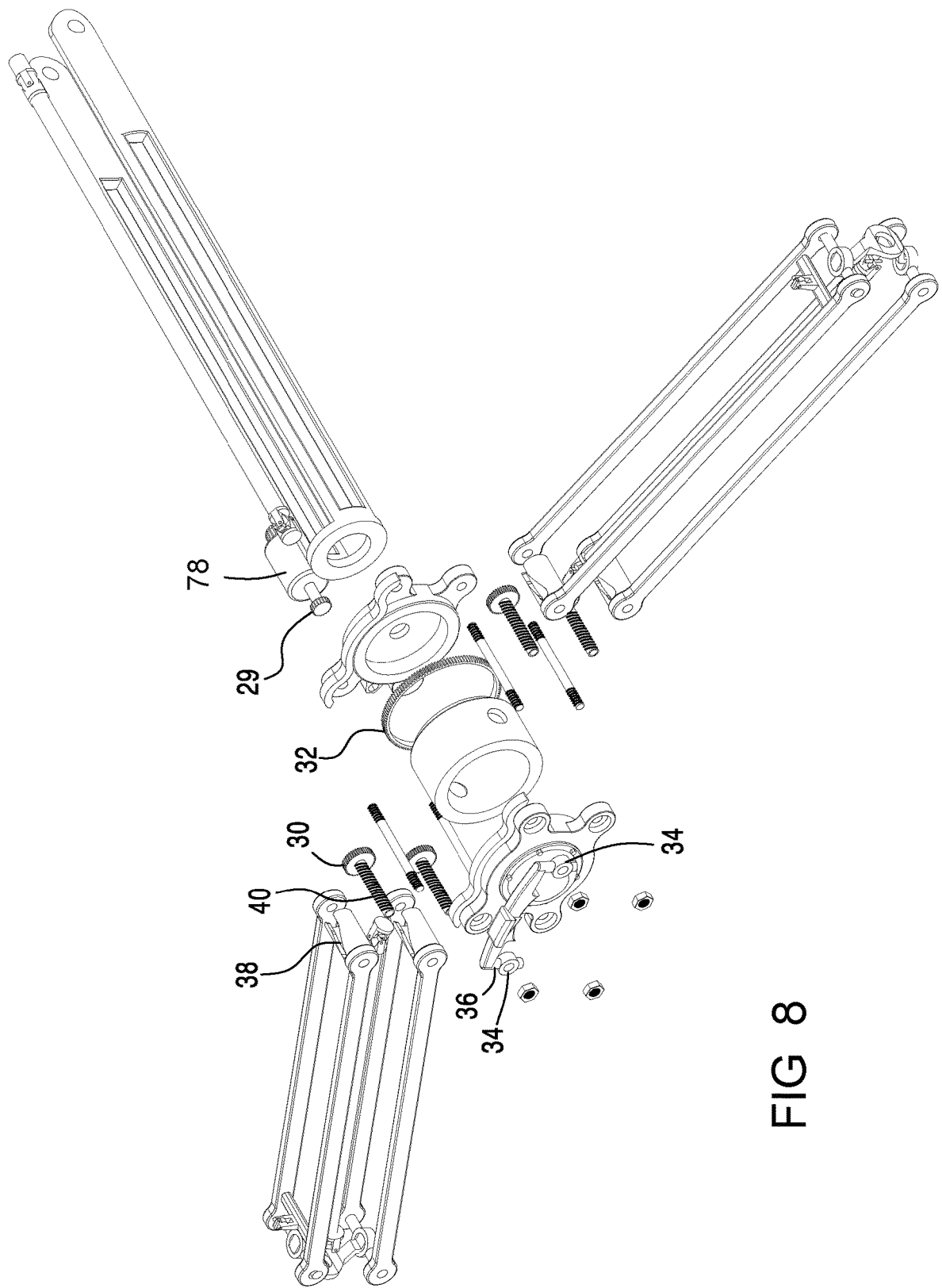
FIG. 8 is an exploded view of the mechanism of FIG. 7.

FIG. 8 is an exploded view of the mechanism of FIG. 7.

Another mechanism 52B for providing the two states, may include a motor 78 for rotating a peripheral cog 32, for rotating bolts 40 for advancing nuts 34 each within and along a shaped hollow shell 38, being rigidly fixed to axles 12R and 12L, thus rotating them one in relation to the other to obtain the rigid axle of FIG. 3.

Numeral 10 denotes the vehicle axle according to one embodiment of the invention;
12L,12R: left and right axles respectively;
14L,14R: left and right wheel hubs respectively;
18: vehicle frame;
20: connecting element;
22: mechanism, which may include an opening and closing ring for binding or releasing the binding;
24: vehicle chassis;

28: hinges;
29,30,31: cogs;
32: peripheral cog;
34: nut;
36: ring;
38: shaped hollow shell;
40: bolt;
42: vehicle springs/suspensions;
50L,50R: hinges;
52A,52B: mechanisms;
58L,58R: hinges;
60: center of chassis 24;
78: motor.

The reference numbers should not be interpreted as limiting the claims in any form.

What is claimed is:

1. A vehicle axle (10), comprising:
 a left axle (12L), a first side thereof being pivotally connected (50L) to a left wheel hub (14L);
 a right axle (12R), a first side thereof being pivotally connected (50R) to a right wheel hub (14R);
 a connector (20), disposed between second sides of said left (12L) and right (12R) axles for pivotally (28) connecting therebetween, for allowing pivotal motion therebetween; and
 a first mechanism (52A,52B) for allowing and disallowing said pivotal motion between said left (12L) and right (12R) axles, thereby providing said vehicle axle (10) an independent suspension state once said first mechanism (52A) allows said pivotal motion between said left (12L) and right (12R) axles, and providing a dependent suspension state once said first mechanism (52A) disallows said pivotal motion between said left (12L) and right (12R) axles,
 wherein said first mechanism (52A) comprises: a bar (56) fixed to said connector (20), ends of said bar (56) comprising binding elements (58L,58R) for allowing binding to said left (12L) and right (12R) axles, and
 wherein said binding elements (54L,54R) comprise extendable extensions (58L,58R) for being inserted into rings (54L,54R) of said left (12L) and right (12R) axles.

2. The vehicle axle (10) according to claim 1, further comprising:
 a second mechanism (52B), for allowing binding said connector (20) to a chassis (24) of said vehicle, and for releasing said binding, for binding said connector (20) to said chassis (24) at said independent suspension state, and for releasing thereof at said dependent suspension state.

3. The vehicle axle (10) according to claim 1, wherein said first mechanism (52B) comprises: hollowed shells (38) being rigidly fixed to said left (12L) and right (12R) axles; and nuts (34), for sliding thereof within and along said hollowed shells (38), thereby rotating said left (12L) and right (12R) axles.

4. The vehicle axle (10) according to claim 2, wherein said first (52A,52B) and second (52B) mechanisms comprise controllable operating means selected from a group consisting of: motorized (78), hydraulic, pneumatic.

5. The vehicle axle (10) according to claim 2, wherein said first mechanism (52A,52B) comprises a ring (22) fixed to said connector (20), for surrounding a center (60) of said chassis (24).

\* \* \* \* \*